United States Patent [19]
Silver

[11] Patent Number: 6,069,656
[45] Date of Patent: May 30, 2000

[54] METHOD AND APPARATUS FOR STABILIZATION OF IMAGES BY CLOSED LOOP CONTROL

[75] Inventor: Alan G. Silver, Monroe, N.Y.

[73] Assignee: Raytheon Company, Lexington, Mass.

[21] Appl. No.: 08/982,228

[22] Filed: Dec. 17, 1997

[51] Int. Cl.[7] .................................................. H04N 5/225
[52] U.S. Cl. ........................................ 348/169; 348/208
[58] Field of Search ................................. 348/169, 170, 348/171, 172, 208; H04N 5/225

[56] References Cited

U.S. PATENT DOCUMENTS

| | | | |
|---|---|---|---|
| 3,617,016 | 11/1971 | Bolsey | 244/3.16 |
| 3,859,460 | 1/1975 | Westell | 178/7.2 |
| 4,615,590 | 10/1986 | Alvarez et al. | 350/500 |
| 4,911,541 | 3/1990 | Alvarez et al. | 350/500 |
| 4,913,547 | 4/1990 | Moram | 356/349 |
| 5,122,908 | 6/1992 | Sporer | 359/557 |
| 5,194,908 | 3/1993 | Lougheed et al. | 356/28 |

*Primary Examiner*—Tommy P. Chin
*Assistant Examiner*—Luanne Din
*Attorney, Agent, or Firm*—William C. Schubert; Glenn H. Lenzen, Jr.

[57] ABSTRACT

A method of applying optical stabilization to the problem of laser designation is provided which simulates the action of a viscous damping mechanism while reducing the weight and cost of the tripod and angulation head used in laser designation applications on a tracking mount. A closed loop electro-optical system is utilized by a predictive filter and a slew filter which require only video output (28) representing a target (20) of interest for feedback. In addition, automatic tracking of a particular target (20) and automatic boresighting of a separable laser designator (14) to a sensor module (12) are provided. In an alternative embodiment, optical stabilization is used with a GPS module (82) in a sensor module (20), which transmits information representing the location of the target (20) to a projectile (84). The projectile (84) uses the information in maintaining its trajectory towards the target (20).

19 Claims, 7 Drawing Sheets

METHOD AND APPARATUS FOR STABILIZATION OF IMAGES BY CLOSED LOOP CONTROL

BACKGROUND OF THE INVENTION

This invention relates to optical stabilization and in particular to a method for optically stabilizing images during the tracking and designation of targets in a laser guided designator system.

Laser Tracking and Designation Processes

A typical laser designator rangefinder system 10 is illustrated in FIG. 1 and consists of three modules; a sighting system or sensor module 12, a laser designation module 14 and a tripod angulation head 16. An operator 18 is typically a forward observer who must carry the laser designator rangefinder system 10 to a remote location, set it up, and then acquire a target of interest which could be moving. The operator 18 must track the target and determine its range in order to obtain a grid coordinate, which is then transmitted to a command station. A laser guided bomb or missile (not shown) is then launched to the grid coordinate provided by the operator 18. The operator 18 will continue to track the target while simultaneously designating it with a laser beam for terminal guidance of the laser guided missile. The operator 18 designates the target by keeping the laser beam fixed on some point on the target. A sensor on the laser guided missile detects the point on the target designated by the operator 18 and guides its trajectory towards that point.

Obviously, to perform these tasks, the laser designator rangefinder system 10 must be maintained in a very stable position, substantially free of extraneous motion relative to the target. This is due to the fact that motion of the laser beam off of the target will cause the laser guided missile to miss the target. Generally it is advisable and typically even necessary to permit low frequency or slow motion of the laser designator rangefinder system 10 with respect to the target in order to allow the operator 18 to follow the system with the target during tracking of a moving target. However, high frequency motion of the laser designator rangefinder system 10 with respect to the target or jitter must be substantially eliminated in order ensure accuracy when tracking and designating a moving target.

During an initial search phase, the operator 18 must search the scene or field of view for a suitable target of interest. During this phase, jitter comprised of relatively high frequencies is undesirably imparted to the laser designator rangefinder system 10 by the operator 18 in moving the system 10 through the field of view.

Therefore, it would be advantageous if jitter during the initial search phase could be reduced beyond that provided by the prior art while reducing the overall weight of the system, thereby enhancing the Modulation Transfer Function (MTF) or optical resolution of the system and range in which potential targets of interest can be recognized using a practical solution.

During a range finding phase, the operator 18 generally selects a button or trigger, which fires the range finder in the sensor module 12. This motion can result in missing the target and receiving false ranges. The target range is important in computing grid coordinates, which will guide the trajectory of the laser guided missile.

Therefore, it would be advantageous if a tracking mode could be engaged, prior to firing a laser used in the range finding phase, which would prevent the optical axis of the laser designator rangefinder system 10 from shifting when the button or trigger used to initiate rangefinding is depressed.

After the target of interest has been obtained during a target tracking phase, the operator 18 must keep the laser beam from the laser designation module 14 on the target while the target is moving until the impact of the laser guided missile during the designation phase. Therefore, it would be advantageous if a track mode could automatically maintain the laser designation module 14 locked onto the target without operator intervention.

In many instances it becomes impractical to utilize the laser designator rangefinder system 10 with the tripod angulation head 16. Such is the case where, for instance, the mobility of the operator 18 is at a premium or the terrain does not permit the use of the tripod. Therefore, it would be advantageous if an alternate stabilization technique was designed to operate independently of the tripod angulation head 16.

Prior Art Methods for Damping Motion in Laser Designator Rangefinder System

One of the methods utilized in the prior art to reduce high frequency motion of the laser designator rangefinder system 10 with respect to the target involves the use of a mechanically viscous damped head coupled to a very sturdy tripod. Such a solution is both heavy (approximately sixteen pounds) and expensive whereas the embodiments of the present invention would add considerably less than one pound.

Therefore, it would be advantageous if motion of a predetermined frequency with respect to the target could be substantially eliminated by using a method that results in a system which is substantially less expensive to manufacture than viscously damped systems. In addition, since the laser designator rangefinder system 10 must be carried by the operator 18 over substantial distances, it would also be advantageous if the weight of such a system could be reduced as well.

In order to reduce further the amount of weight carried by any one operator 18, an ideal system would comprise two separate modules; the sighting module 12 and the designation module 14, which could be carried independently by two operators and then assembled in the field. A problem arises, however, involving the method used in correlating the boresight of the two separate modules once assembled. Relatively precise tolerances must be maintained in order to guarantee positioning of the two separate modules with respect to each other so that the difference in boresight between them can be regarded as substantially constant and factored out during calculations. A substantial mounting fixture must be used in order to maintain such precise tolerances in the positioning of the two modules with respect to each other once assembled, and this too becomes heavy and costly.

Therefore, it would be advantageous if the boresights or optical axes of the sensor module 12 and the laser designator module 14 could be automatically aligned upon completion of assembly in the field. Such an automatic boresighting feature would compensate for greater tolerances in the assembly hardware that mates the sensor module 12 to the laser designator module 14, further reducing system weight and cost over the prior art.

Another solution found in the prior art involves stabilization through electronic means, which is typically used in camcorders. However, such a method cannot be used to stabilize multiple sensors, and requires that a portion of the field of view be sacrificed. Yet another prior art solution involves the use of gyroscopes to stabilize the sensor module or sighting system. For instance, steady cam television camera systems are gyroscopically stabilized to reduce jitter caused by a cameraman operating the system. However, systems that use gyroscopes are typically quite large and heavy, making them impractical for deployment in the field by one or two operators. In addition, the cost of such a system would generally be considered prohibitive for man-portable systems which are typically purchased in large quantities.

Such a concept incorporating the advantages discussed above could be utilized in applications where viscously damped tripods are currently used and where electronic stabilization is not practical. For instance, such a system could provide major benefits if utilized in multispectral multi-sensor systems, including high performance manually controlled tracking systems such as the Long Range Advanced Scout Surveillance System (LRAS3) and other scout systems as well as photographic and cinematographic equipment.

Alternative Guidance Methods without Laser Designation

Laser guided missiles of the prior art typically involve the use of laser designation of the target by a soldier situated in the field. The act of maintaining a beam of light on the target in order to guide the missile to the target places the soldier in an extremely vulnerable position. By actively emitting energy, which is detectable, the soldier becomes a target. In addition, since the soldier is already burdened with heavy laser designation equipment, the amount of additional weaponry he can carry is limited.

Therefore, it would be advantageous if a GPS/INS (Global Positioning/Inertial System) based system would alleviate the need for personnel to carry laser designation equipment in the field and continuously maintain the laser on the target in order to guide the missile.

SUMMARY OF THE INVENTION

In accordance with the present invention, a method for stabilizing optical images is provided, comprising the steps of reflecting an optical image with a reflective surface onto an imaging means, transducing the reflected image into an electrical signal such as a video signal representative of the optical image, calculating a current scene-invariant feature of at least one of a plurality of features extracted from the image, comparing the current scene-invariant feature with a prior scene-invariant feature in order to determine a feature displacement vector, modifying a slew rate of the feature displacement vector, thereby dampening the rate of change in the feature displacement vector, and modifying a position of the reflective surface in accordance with the feature displacement vector, thereby causing the reflective surface to track at least one of the features. The scene-invariant feature may comprise centroids, leading edges, skeletons, or predetermined geometric shapes, curves, lines and points of interest to an operator for purposes of tracking a target.

In further accordance with the present invention, a subsequent feature displacement vector is predicted using a second order predictive filter comprising variable weighting factors. The step of modifying the slew rate of the feature displacement vector is performed with a low pass filter also comprising variable weighting factors, which may be automatically varied over the travel of the reflective surface in order to ensure that the reflective surface is not restrained at the limits of its travel.

In still further accordance with the present invention, the plurality of features may comprise at least one target, thereby enabling the reflective surface to track movement of the target in a track mode while remaining substantially immune to predetermined movement with respect to the image.

In accordance with the present invention, an apparatus for applying optical stabilization to laser designation systems is provided, which comprises reflecting means for reflecting an image, imaging means for transducing the reflected image into an electrical signal representative of the image, and stabilization means for outputting a feature displacement vector based upon the electrical signal by calculating a current scene-invariant feature of at least one of a plurality of features extracted from the image and comparing the current scene-invariant feature with a prior scene-invariant feature, wherein the feature displacement vector used to control a position of the reflecting means is such that the position compensates for undesirable displacement of the image.

In further accordance with the present invention, the stabilization means comprises predicting means for predicting a subsequent feature displacement vector by using a second order predictive filter and slew filter means for modifying a slew rate of the feature displacement vector, thereby dampening the rate of change in the feature displacement vector.

In further accordance with the present invention, the apparatus for applying optical stabilization to laser designation systems further comprises designator means for designating a target to laser guided apparatus by casting a beam of light on a target, the designator means comprising a designator boresight, the designator means directing the beam of light to an initial aim point along the designator boresight, and sensing means for determining a position of the target and the initial point, the sensing means for calculating a difference vector between the target and the initial point and providing the difference vector to the designator means, the designator means using the difference vector to move the designator boresight from the initial aim point to the target, thereby automatically directing the designator boresight at the target without operator intervention.

In still further accordance with the present invention a guided projectile system is provided, which comprises means for sensing and a projectile. The means for sensing comprises reflecting means, imaging means, stabilization means, a first GPS module, and means for target location. The reflecting means reflects an image. The imaging means transduces the reflected image into an electrical signal representative of the image. The stabilization means outputs a feature displacement vector based upon the electrical signal by calculating a current scene-invariant feature of at least one of a plurality of features extracted from the image and compares the current scene-invariant feature with a prior scene-invariant feature, calculated prior in time. The feature displacement vector is used to control a position of the reflecting means such that the position compensates for undesirable displacement of the image, thereby dampening a rate of change of the electrical signal. The first GPS module receives information representing a substantially absolute location of the means for sensing. The means for target location receives information representing the substantially absolute location of the means for sensing from the first GPS module. The means for target location receives target coordinates representative of a location of a target in the image. The means for target location calculates a substantially absolute location of the target from the substantially absolute location of the means for sensing and the target coordinates. The means for target location transmits the substantially absolute location of the target. The projectile comprises a second GPS module and a trajectory adjustment unit. The second GPS module receives information representing a substantially absolute location of the projectile. The means for trajectory adjustment receives the substantially absolute location of the target from the means for target location and the substantially absolute location of the projectile from the second GPS module. The means for trajectory adjustment guides the trajectory of the projectile on a path from the substantially absolute location of the projectile to the substantially absolute location of the target. A tracking mode may be instituted which enables the reflective surface to track movement of the target while remaining substantially immune to movement not associated with the target. The tracking mode may be further enhanced by enclosing the target within a window, which represents a portion of the full scene originally processed. This essentially results in zooming in on the target. In this way the image within the window comprising the target can be processed at an increased update rate while retaining the same data rate since there is less to process within the window as compared to the full scene.

DETAILED DESCRIPTION OF THE PREFERRED EMBODIMENT

Operation without Stabilization

Figure 3A:
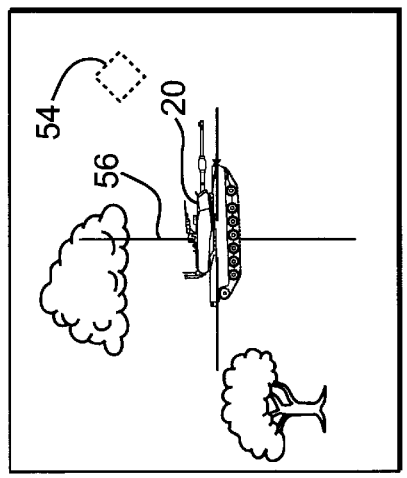
FIG. 3A–3E illustrate typical images as provided by the laser designator rangefinder system of FIG. 1 during various modes of operation.

Details regarding optics, signal processing and control theory which are useful in understanding the present invention are provided in R. Dorf, *Electrical Engineering Handbook* (1993), which is hereby incorporated by reference. FIG. 3A illustrates a typical scene as seen by the operator without the stabilization provided by the present invention. The scene comprises a substantial amount of jitter in a target of interest, such as a tank 20, as illustrated. Such jitter degrades the Modulation Transfer Function (MTF) or optical resolution of the imaging systems within the laser designator rangefinder system 10 as well as the ability of the operator and the system to recognize particular targets. In addition, jitter interferes with the ability to range or designate moving targets.

Operation with Stabilization

Figure 2:
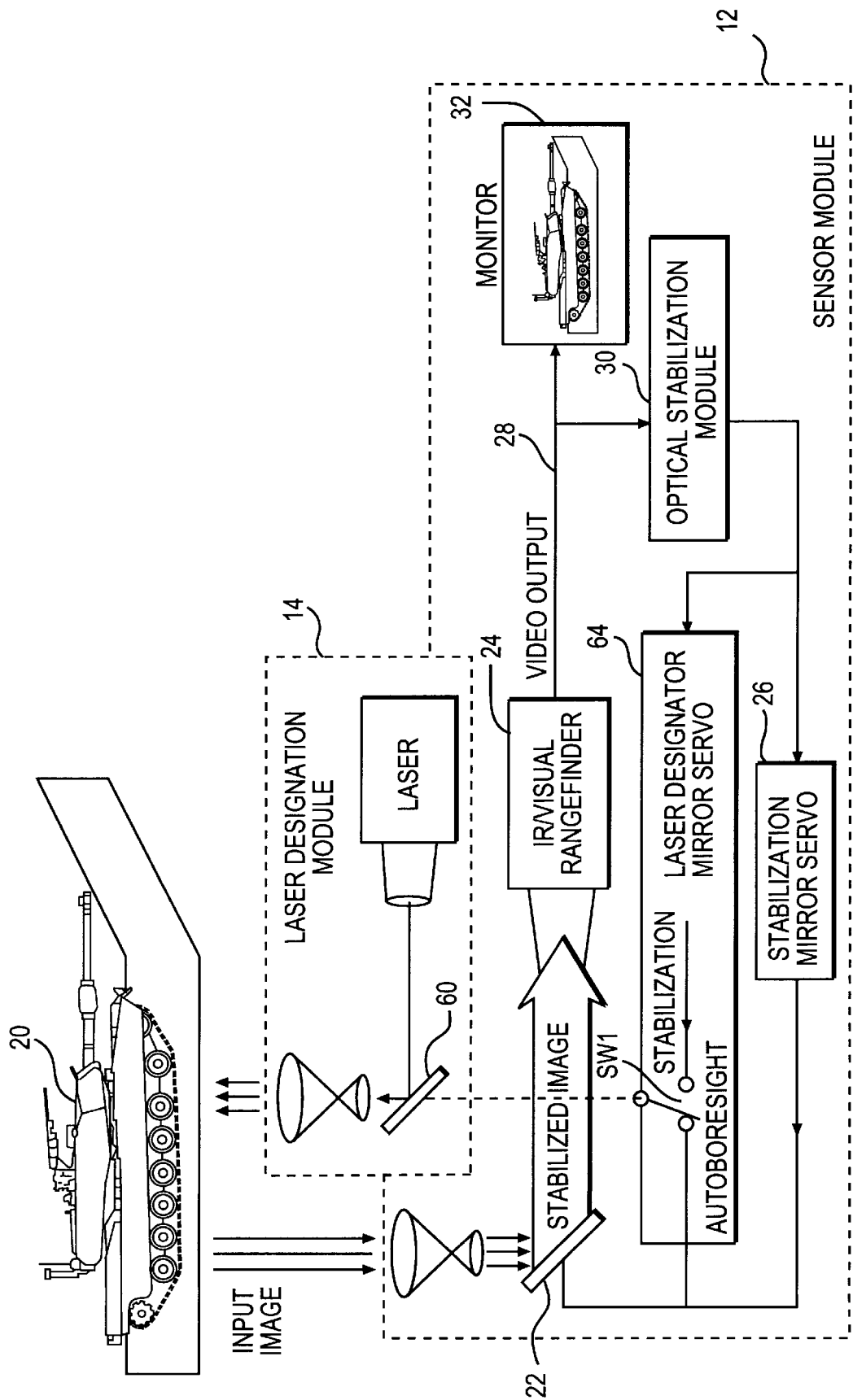
FIG. 2 illustrates a block diagram of the laser designator rangefinder system of FIG. 1.
Figure 3B:
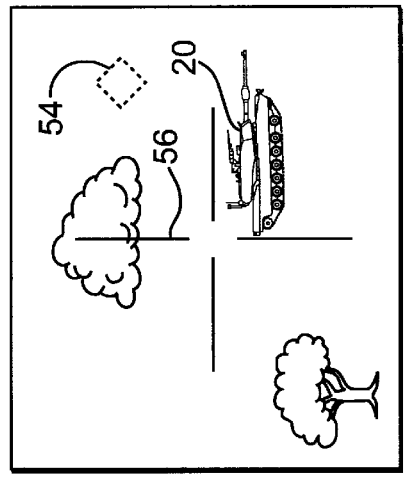
Figure 3C:
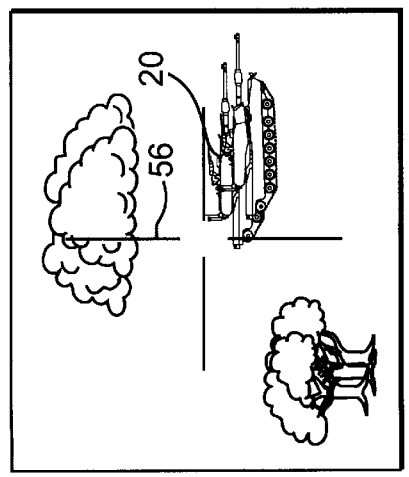

FIG. 3B illustrates the improvement that stabilization provides through application of the present invention. As is readily apparent, the tank 20 as well as background objects no longer reflect any appreciable amount of jitter. Thus, the MTF is improved, resulting in an increased range within which potential targets and morphological features such as geometric shapes and curves may be recognized by both the operator and the system. The improvement in stabilization is accomplished through adjustments in a reflective surface or stabilization mirror 22, as shown in FIG. 2. The reflective surface or stabilization mirror 22 is common to the optical paths of a direct view visible system, a range finder and an infrared imaging Forward Looking Infrared (FLIR) system illustrated as an IR/Visual Rangefinder or imaging means or imager 24 in FIG. 2.

Figure 4:
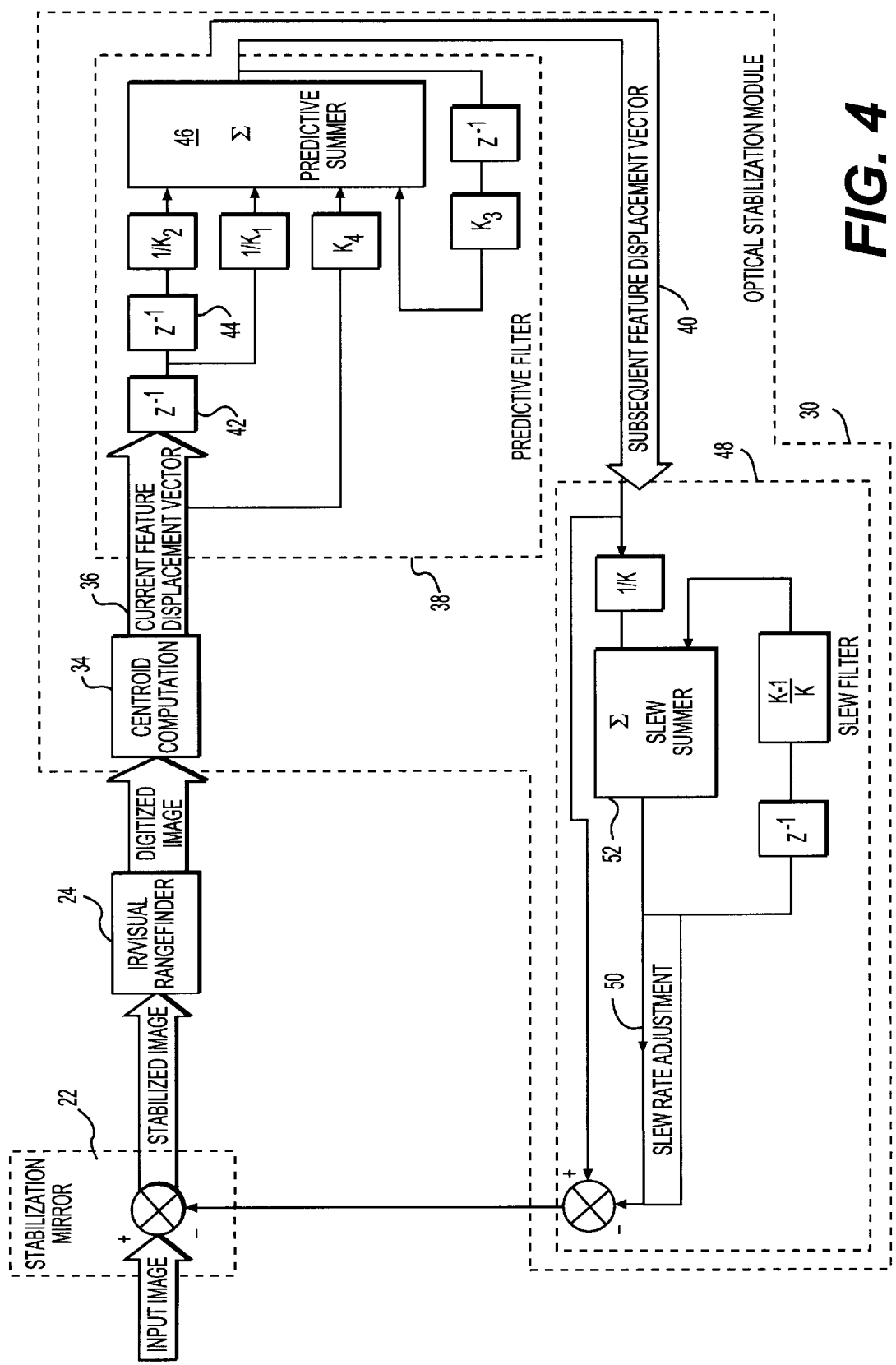
FIG. 4 illustrates a functional block diagram of an optical stabilization module included in FIG. 2.

The stabilizing effect of the stabilization mirror 22 is achieved through a stabilization mirror servo 26 and optical stabilization module 30, which use a digitized image or electrical signal in the form of a video output 28 from the FLIR in the IR/Visual Rangefinder 24 to close the loop as shown schematically in FIG. 2 and in more detail in FIG. 4 FIG. 4 provides a functional block diagram of the optical stabilization module or stabilizer 30 illustrated in Fig.2 wherein the details of the present invention are performed. As shown in FIG. 4, the scene is imaged by an IR camera within the IR/Visual rangefinder 24, which then outputs a digitized image 28 as video output. The video output is provided to a monitor 32 for viewing by the operator.

The digitized image 28 is input to the optical stabilization module 30. Within the optical stabilization module 30, features are extracted from the digitized image 28, and the centroid of those features is computed in the centroid computation block 34. The centroid (i.e., center of the chosen features) is used for purposes of tracking a target. The general concept utilized in tracking with the laser designator rangefinder system 10 of the present invention involves the use of large area features as opposed to small area points to allow tracking down to very low video signal to noise levels. Typical algorithms which would be employed in the extraction of features would search for skeletons, edges or other types of features well known in the art. The centroid of one or more features is obtained by averaging means well known in the art, however the use of centroids in the present invention is intended to be exemplary and in no way a limitation, where for instance alternative features well known in the art may be calculated and used for tracking as well.

As illustrated in FIG. 4, the computed centroid of the current field is compared to that of the previous field, yielding a current feature displacement vector 36 comprising a direction and a magnitude representative of the motion of the centroid of the chosen features. The current feature displacement vector 36 is then passed through a predictive filter 38 that computes a subsequent feature displacement vector 40. The subsequent feature displacement vector 40 represents a position of the centroid in the next unit of time. This prediction is based on the current scene velocity and those from the two previous frames. Therefore, the prediction can be computed from the current feature displacement vector 36 and its first time derivative 42 and second time derivative 44. As shown in the system diagram of the predictive filter 38 of FIG. 4, the first derivative is multiplied by the reciprocal of a first weighting factor or constant K1; the current feature displacement vector 36 is multiplied by a fourth weighting factor or constant K4; and the second time derivative 44 is multiplied by the reciprocal of a second weighting factor or constant K2. These values are then summed in a predictive summer 46 along with a first time derivative of a prior sum multiplied by a third weighting factor or constant K3. The predictive filter 38 as illustrated and described above, although indicative of a standard second order predictive filter, is intended only as an example and is not intended to limit the present invention to a particular type of filter.

The values of the weighting constants may be varied according to differences in system and environmental parameters in order to achieve more accurate predictions. Once the weighting constants are initialized to a reasonable value within standard ranges well known in the art the values may be further improved upon by means well known in the art such as numerical binary searches and best guess approximations in light of empirical analysis and simulation results. Further details regarding the determination of values for the weighting constants may be found in R. Dorf, *Electrical Engineering Handbook* (1993) and D. Christiansen, *Electronics Engineers' Handbook* (1997), which are hereby incorporated by reference.

The subsequent feature displacement vector 40 is then input into a slew filter 48 which permits the subsequent feature displacement vector 40 and thus the scene to slew at a predetermined limited rate as determined by the choice of weighting factor or constant K. The slew filter 48 is essentially a low pass filter which multiplies the subsequent feature displacement vector 40 by the reciprocal of a first weighting constant K and sums the result in a slew summer 52 with a first time derivative of a prior slew rate adjustment 50 multiplied by (K–1)/K.

Without the correction in slew rate, the scene would not be allowed to move at all, thus making panning and tilting impossible. The subsequent feature displacement vector 40 is corrected for slew by deducting the slew rate adjustment 50 and the result is then used to correct the position of the stabilization mirror 22. Both the predictive filter 38 and the slew filter 48 could be implemented by any of a variety of means well known in the art comprising microprocessors, digital signal processors, or discrete digital signal processing integrated circuits.

During the searching phase, the operator must ensure that the stabilization mirror 22 does not exceed its travel and that a sufficient amount of travel is maintained in order to permit correction for stabilization. For this purpose an icon 54 such as the diamond illustrated in FIGS. 3B–E is provided. The icon 54 represents the position of the stabilization mirror 22 with respect to its field of travel. If the stabilization mirror 54 is allowed to run to its end of travel, the stabilization mirror 22 will no longer be able to make compensating adjustments in order to stabilize the scene. Therefore, the operator must keep the icon 54 within the field of view by adjusting the position of the tripod angulation head 16 illustrated in FIG. 1.

Alternatively, this function may be performed automatically by the laser designator rangefinder system 10 by sensing the position of the stabilization mirror 22 in its travel and adjusting the slew rate via the first weighting constant K. Such a system 10 could allow for greater slew rates as the stabilization mirror 22 reaches the end of its travel and lesser slew rates during the period when the stabilization mirror 22 occupies its center of travel. This would make the quality of the stabilization a function of the slew rate of the tripod angulation head 16, thereby reducing the number of tasks the operator must monitor.

Sighting the Target of Interest

Once the operator finds the target of interest, the operator will center a set of cross hairs 56 on it and select a track mode by pushing a button, trigger or an equivalent means well known in the art. Sighting in on the target of interest in illustrated in FIG. 3C. The track mode permits the optical stabilization module 30 to lock onto the target of interest, in this case the tank 20, and follow it despite movements caused by the operator or his environment. Coordinates of the target 20 are derived by means well known in the art from the range between the system 10 and the target 20 (as provided by the rangefinder), the absolute position of the system 10 (as provided by a global positioning system (GPS) receiver), and the absolute direction from the system 10 to the target 20 (as provided by a digital compass).

Application of the Track Mode

At this point, the stabilization mirror 22 will attempt to stabilize the scene in the vicinity of the cross hairs 56, as opposed to the entire scene. The act of pushing a button (i.e., the track button) can and typically does upset an aim point of the system indicated by the center of the cross hairs 56. Once the system is in the track mode, however, the aim point can be refined through the use of a vernier adjustment, which will offset the track to the desired optimal aim point by means well known in the art. Due to the fact that the system is in track mode, slight motion of the system will not affect the aim point since the motion will be compensated for by the stabilization mirror 22.

Compensation for extraneous motion becomes particularly important in the next step, which is to determine the range to the target using a single pulse of the laser. If the sensor jumps due to depression of a button or trigger the target of interest could be missed resulting in a false range reading. The fact that the system is already tracking the target when a range button is pushed prevents such "trigger jerk" and ensures accuracy in the aiming of the rangefinder the first time.

Figure 3D:
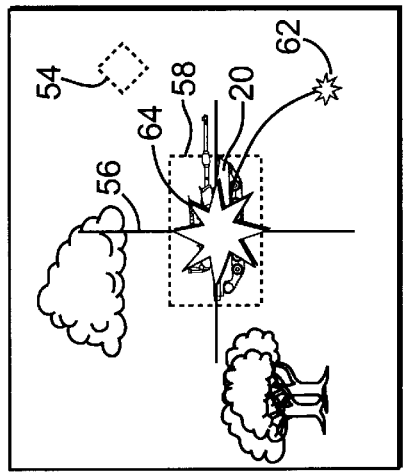
Figure 3E:
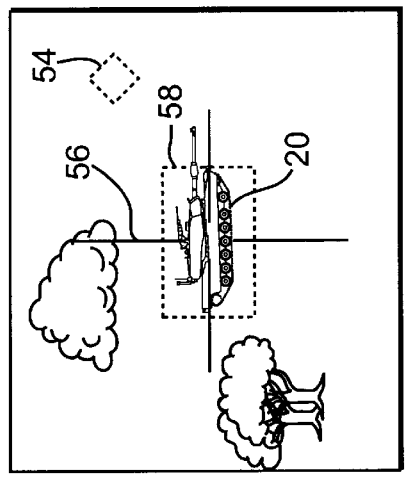

In the track mode it is possible to either use the full scene or to go into a windowing or zoom mode as illustrated by a target window 58 in FIGS. 3D and 3E. In the windowing mode, only the center half of the horizontal and vertical quadrants defined by the cross hairs 56 are processed and viewed. This effectively increases the field, update or sample rate, or that rate at which the scene or a portion of it is processed and compensated (i.e. throughput), by a factor of four without increasing the data rate at which the system operates. This results in an increase in accuracy and, since the limitations of stabilization are due to the amount of motion of the scene between samples or units of time, the increase in sample or update rate will improve stabilization by the same factor of four.

Designation Mode

Figure 1:
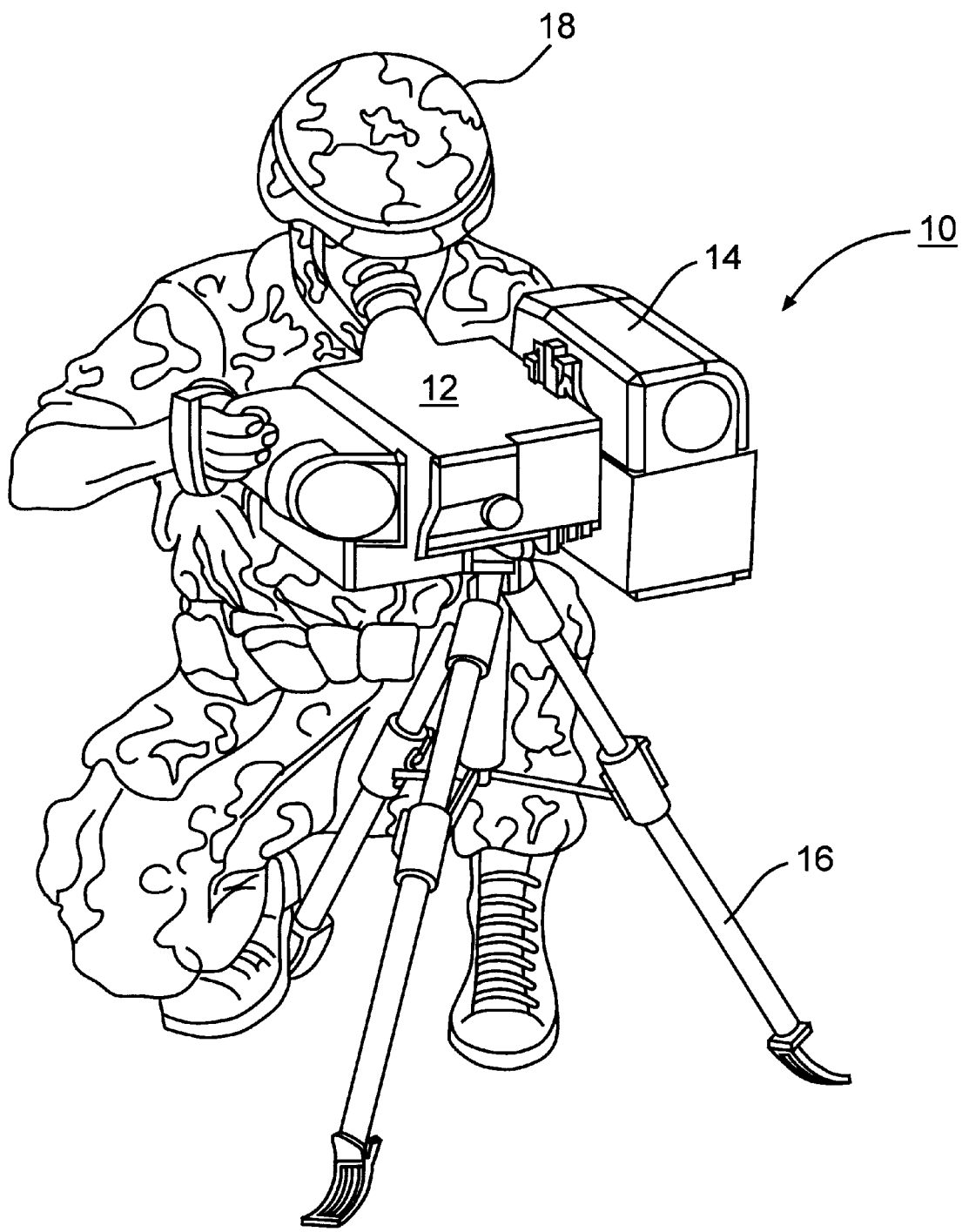
FIG. 1 illustrates a laser designator rangefinder system use by an operator in the field.

Referring to FIG. 2, a laser designator mirror 60 is illustrated and is located in the laser designator module 14 of FIG. 1. The laser designator mirror 60 is slaved to the optical stabilization module 30 by a switch SW1 positioned in a stabilization setting, enabling compensations for stabilization applied to the stabilization mirror 22 to be applied to the laser designator mirror 60 as well via a laser designator mirror servo 64.

During laser designation the switch SW1 is positioned on an autoboresight setting as shown in FIG. 2.

When the laser designator module 14 is first fired, the laser designator mirror 60 is deliberately aimed low at, for instance, a designator spot or aim point 62 as shown in FIG. 3E in order to ensure a ground return. A ground return is ideal since in this way the reflection of the laser is ensured, as opposed to the situation where the laser is fired over the target above the horizon in which case the laser will not be returned. The reflection of the designator spot 62 is sensed by the FLIR whose frame has been synchronized to the firing of the laser designator module 14. Since the FLIR can sense the return of the designator spot 62 and the FLIR knows the position of its crosshairs, the FLIR can calculate the distance and direction (in both x and y directions) from the designator spot 62 to the center of the cross hairs. This distance and direction is then provided to the laser designator mirror 60 as a correction which brings the next pulse directly onto the center of the cross hairs or terminal target point 64. Thus, differences between the boresight of the laser designator module 14 and the boresight of the sensor module 12 are automatically compensated for without operator intervention. Since mounting tolerances between the laser designator module 14 and the sensor module 12 are automatically compensated for, the modules may be separately transported into the field and mated together using a far lighter and simpler mechanical interface.

Conceptual Test

Figure 5:
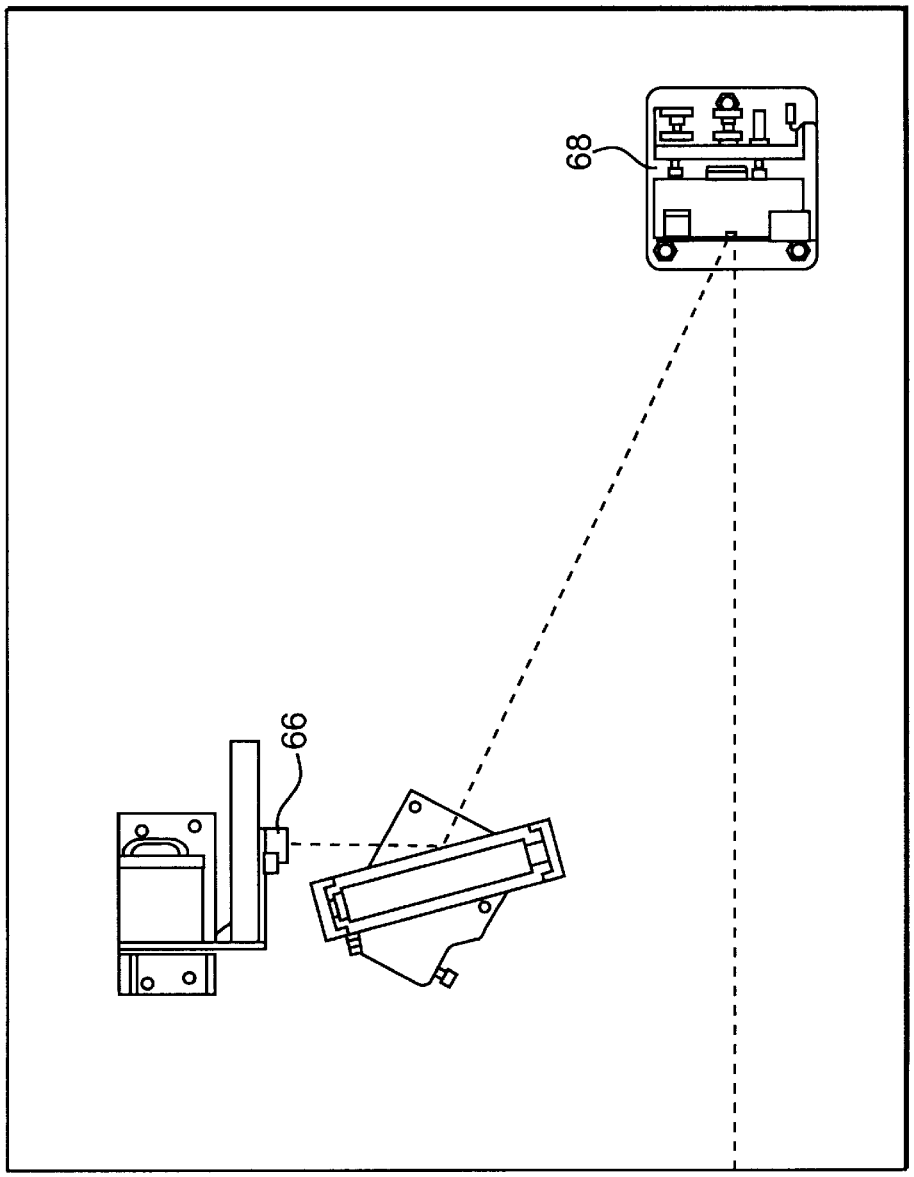
FIG. 5 illustrates a block diagram of a test setup for the laser designator rangefinder system of FIG. 1.
Figure 6:
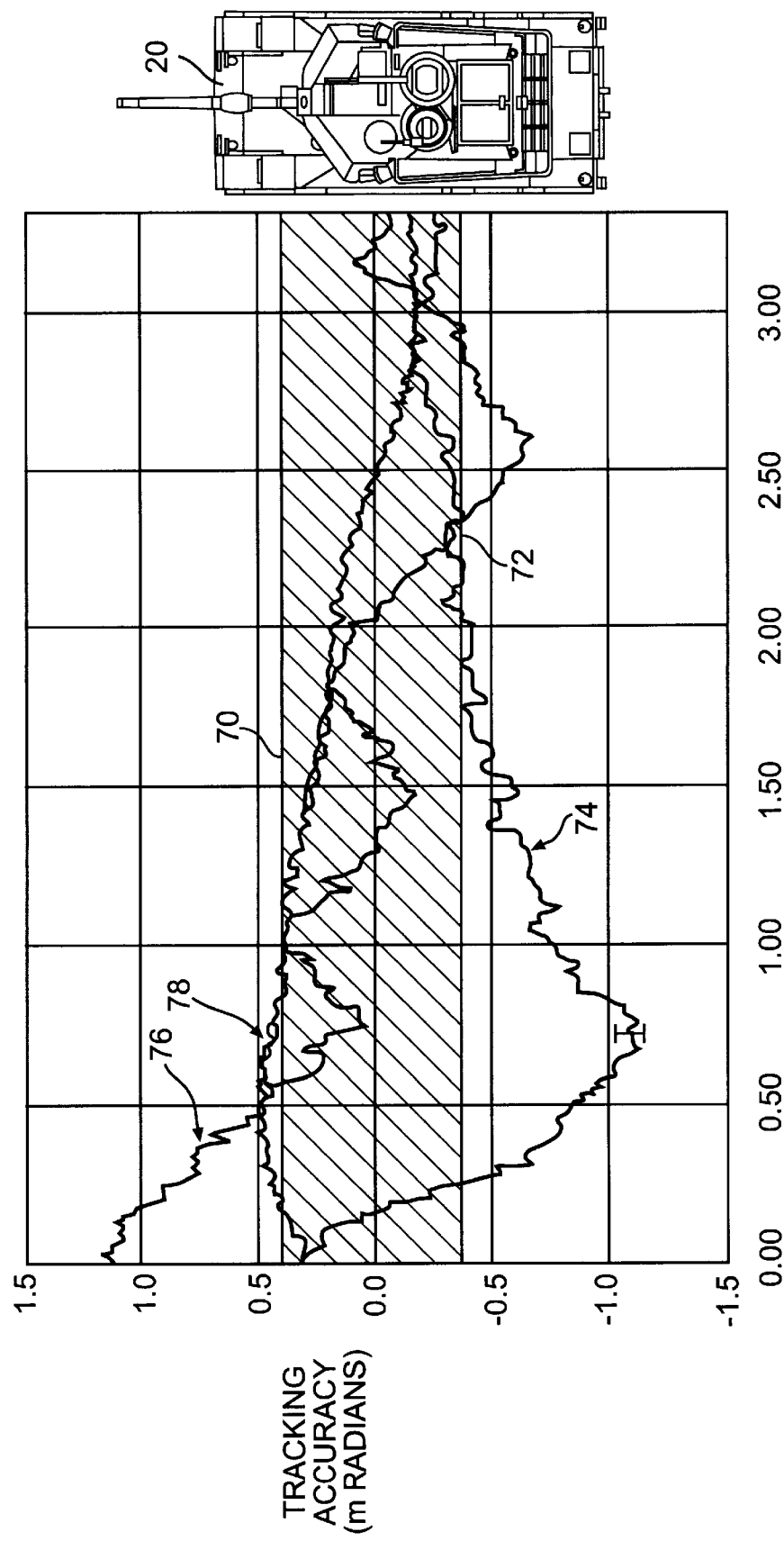
FIG. 6 illustrates tracking accuracy as a function of time using the test setup of FIG. 5.

The present invention was tested by evaluation with several different tripod angulation heads 18. A test setup is illustrated in FIG. 5. A point target was set up in the focal plane of a collimator 68. The point target 66 was mounted on a moving stage to produce motions of 3.7 milliradians/sec which simulates vehicle motion of 40 km/hour at 3 km. The point target 66 was observed and tracked by an operator 18 through a visible camera mounted on the tripod angulation head 18. The operator 18 would try to keep the target at the center of the cross hairs. The distance from the cross hairs or tracking accuracy was computed in real time from the video output of a TV simulating the IR/Visual rangefinder and recorded by a computer. The results of the experiment are illustrated graphically in FIG. 6.

The task of the operator was to keep the laser designator on the tank 20 and preferably on a selected aim point on the tank 20 as it travels cross range at speeds up to forty kilometers per hour and ranges from 1.5 to five kilometers. Typical mission times are from 3 to 15 seconds. The shaded portion of the curve between lines 70 and 72 represent the angular extent of the tank 20 at three kilometers. A viscous damped trace 74 represents baseline results from the tripod angulation head comprising very heavy viscous damping at a weight of more than fifteen pounds. It can readily be seen that as the operator begins to track the target that he overshoots by about one milliradian on the viscous damped trace 74 and that he is within the dimensions of the tank 20 within two seconds and continues to stay within those dimensions for the duration of the test.

A non-stabilized trace labeled 76 represents the condition without stabilization comprising a tripod angulation head which is much lighter, (4.5 pounds) and less expensive than the baseline tripod angulation head. It can be seen that initial track errors are also about one milliradian. However, the track error does not settle down as it does in the case of the viscous damped trace 74. Therefore, the tripod angulation head without stabilization, although much lighter and cheaper, exhibits performance which is unacceptable relative to the minimal standards exhibited by the baseline viscous damped tripod angulation head.

A stabilized trace labeled 78 represents the same tripod angulation head as used to produce the non-stabilized trace 76 except that the stabilization method of the present invention was utilized. In order to arrive at the stabilized trace 78 the data represented by the non-stabilized trace 76 was passed through the stabilization simulation model illustrated in FIG. 4, using the following constants K=64, K1=−20, K2=9, K3=K4=1. By comparing the stabilized trace 78 with that of the baseline 74 the following observations result:

1. a reduction in the initial overshoot (from approximately one milliradian to approximately 0.5 milliradians);
2. a reduction in target acquisition time (from approximately two seconds to one second), which provides for better guidance of the laser guided bomb and reduces the duration of time the operator is exposed to potentially dangerous situations; and
3. a reduction in tracking jitter which permits finer aim point selection.

Therefore, the stabilization method of the present invention is not only feasible but also provides better tracking at significantly lower weight and cost than the conventional technique of damping by viscous fluids.

The values of the weighting constants may be varied according to differences in system and environmental parameters in order to achieve more accurate predictions. Once the weighting constants are initialized to a reasonable value within standard ranges well known in the art the values may be further improved upon by means well known in the art such as numerical binary searches and best guess approximations in light of empirical analysis and simulation results. Further details regarding the determination of values for the weighting constants may be found in R. Dorf, *Electrical Engineering Handbook* (1993) and D. Christiansen, *Electronics Engineers' Handbook* (1997), which are hereby incorporated by reference.

Optical Stabilization in Systems Without a Laser Designator

Figure 7:
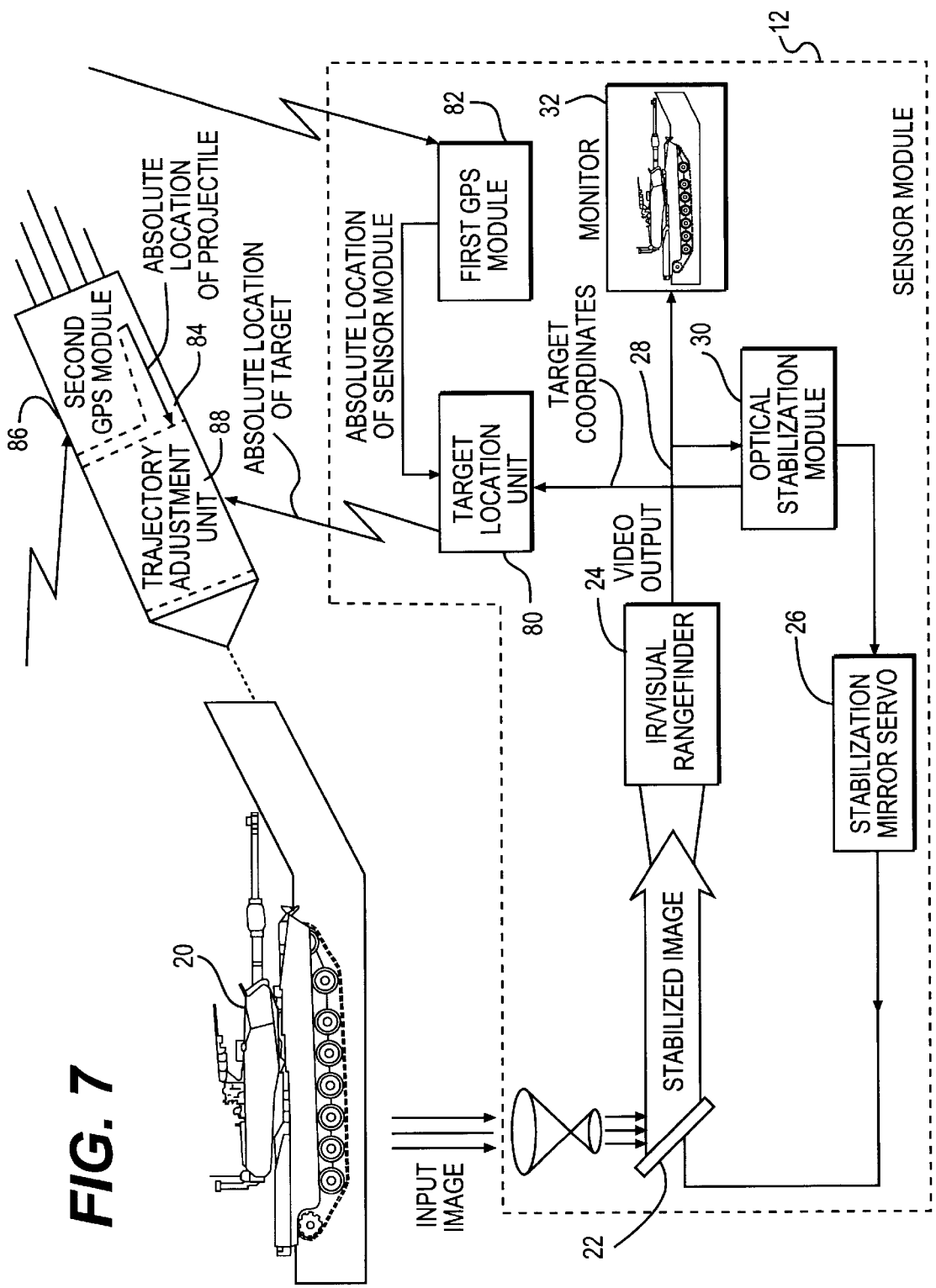
FIG. 7 illustrates an alternative embodiment of a sensor module of FIG. 1 used to transmit trajectory guidance information to a projectile.

FIG. 7 illustrates an alternative embodiment of the present invention wherein a missile, bomb or projectile 84 is guided by information transmitted from the sensor module 12 without the necessity of maintaining the laser beam on the target 20. The laser designator module 14 is no longer required in this embodiment resulting in a safer method of guiding the projectile 84 to the target 20. Instead, the sensor module 12 comprises a first Global Positioning System (GPS) module 82 and a target location unit 80.

The first GPS module 82 receives wireless information representing a substantially absolute location of the sensor module via means well known in the art. This information is transferred to the target location unit 80 along with target coordinates representing the location of the target 20 relative to the sensor module 12. The location of the target 20 relative to the sensor module 12 is determined by the optical stabilization module 30 using substantially the same method as described above with reference to the laser designator rangefinder system 10. Given information representing the location of the target 20 relative to the sensor module 12 coupled with information representing the substantially absolute location of the sensor module 12, the target location unit 80 is able to calculate a substantially absolute location of the target 20 by means well known in the art such as by using well known geometric, trigonometric and algebraic concepts.

The projectile 84 comprises a second GPS module 86 which receives wireless information representing a substantially absolute location of the projectile 84 via means well known in the art and transfers this information to a trajectory adjustment unit 88. The trajectory adjustment unit 88 uses the information representing the substantially absolute location of the projectile 84 in conjunction with the substantially absolute location of the target 20, transmitted by the target location unit 80, to maintain the trajectory of the projectile 84 on a path to the target 20. Although the trajectory of the projectile 84 is illustrated as a straight line, it in fact follows a substantially parabolic path comprising imperfections or tangent in the parabola denoting the corrections required in order to maintain the projectile 84 on its path toward the target 20. Calculations typically performed by the target location unit 80 comprise standard methods for calculating the equation of a line given two points on that line well known in the art. For instance, assuming the substantially absolute location of the projectile 84 is one point and the substantially absolute location of the target 20 is another point, the line between these points defines the desired trajectory of the projectile 84 can readily be calculated. It is anticipated that the target location unit 80 will transmit the substantially absolute location of the target 20 at a predetermined update rate. Likewise, the trajectory adjustment unit 88 in the projectile 84 adjusts its trajectory according to the information in each update regarding the location of the target 20, thereby enabling the projectile to track a moving target.

The track mode may be applied in the embodiment illustrated in FIG. 7 with or without the windowing or zoom mode to achieve a substantially similar increase in update rate resulting in increased accuracy and stabilization while retaining the same data rate as described above.

Although the invention has been shown and described with respect to best mode embodiments thereof, it should be understood by those skilled in the art that the foregoing and various other changes, omissions and additions in the form and detail thereof may be made therein without departing from the spirit and scope of the present invention.

I claim:

1. A method for stabilizing an optical image, comprising the steps of:

reflecting an optical image with a reflective surface onto an imaging means;

transducing said reflected image into an electrical signal representative of said optical image;

calculating a current scene-invariant feature of at least one of a plurality of features extracted from said image;

comparing said current scene-invariant feature with a prior scene-invariant feature calculated prior in time in order to determine a feature displacement vector;

modifying a slew rate of said feature displacement vector, thereby substantially dampening the rate of change in said feature displacement vector; and modifying a position of said reflective surface in accordance with said feature displacement vector, thereby causing said reflective surface to track at least one of said features.

2. The method of claim 1, wherein said scene-invariant feature comprises a centroid.

3. The method of claim 1, wherein said scene-invariant feature comprises a leading edge.

4. The method of claim 1, wherein said scene-invariant feature comprises a skeleton.

5. The method of claim 1, wherein said step of modifying a position of said reflective surface in accordance with said subsequent feature displacement vector comprises rotating said reflective surface about an axis of rotation.

6. The method of claim 1, wherein said imaging means obtains said image using an infrared spectrum.

7. The method images of claim 1, wherein said electrical signal comprises a video signal suitable for display on a monitor.

8. The method of claim 1, wherein said features comprise predetermined geometric shapes, curves, lines and points of interest to an operator for the purposes of tracking a target.

9. The method of claim 1, wherein said step of modifying said slew rate further comprises a step of predicting a subsequent feature displacement vector based on said feature displacement vector.

10. The method of claim 9, wherein said step of predicting said subsequent feature displacement vector comprises predicting with a second order predictive filter.

11. The method of claim 9, wherein said step of predicting said subsequent feature displacement vector further comprises the steps of calculating a first time derivative and a second time derivative of said feature displacement vector;

multiplying each of said feature displacement vector, said first time derivative, and said second time derivative by a first, second and third weighting factor, respectively;

summing said feature displacement vector, said first time derivative, said second time derivative each multiplied by said weighting factors with a prior sum, summed prior in time, multiplied by a fourth weighting factor, thereby providing said subsequent feature displacement vector.

12. The method of claim 11, further comprising modifying said weighting factors according to environmental and system parameters.

13. The method of claim 1, wherein said step of modifying a slew rate of said feature displacement vector further comprises the steps of multiplying said feature displacement vector by a fifth weighting factor;

calculating a current slew sum by summing said feature displacement vector multiplied by said fifth weighting factor with a first derivative of a prior sum, summed prior in time, multiplied by a sixth weighting factor; and subtracting said current slew sum from said subsequent feature displacement vector, thereby modifying said slew rate of said feature displacement vector.

14. The method of claim 13, further comprising modifying said weighting factors according to environmental and system parameters.

15. The method of claim 13, further comprising modifying said weighting factors according to said position of said reflective surface such that said slew rate is decreased when said position of said reflective surface is not within a predetermined range near an end of potential travel for said reflective surface, thereby ensuring that said reflective surface can respond to changes in said feature displacement vector without operator intervention while said position is not near said end of potential travel for said reflective surface.

16. The method of claim 13, further comprising modifying said weighting factors according to said position of said reflective surface such that said slew rate is increased as said position of said reflective surface is near an end of potential travel for said reflective surface, thereby ensuring that said reflective surface can respond to changes in said feature displacement vector without operator intervention while said position is near said end of potential travel for said reflective surface.

17. The method of claim 1, wherein said plurality of features comprise at least one target, thereby enabling said reflective surface to track movement of said target in a track mode while remaining substantially immune to predetermined movement with respect to said image.

18. The method of claim 17, further comprising initiating said track mode by selecting a switch.

19. The method of claim 17, wherein said track mode further comprises a window substantially enclosing said target, said window being a portion of a full scene, said method for stabilizing an optical image being restricted to processing contents of said window as opposed to contents of said full scene, said method adapted to process said contents of said window at a higher sample rate than possible for processing said contents of said full scene given substantially equivalent predetermined data rates, thereby resulting in an increase in accuracy and stabilization with respect to processing said contents of said full scene by said method.

* * * * *